H. HESS.
ANTIFRICTION BEARING.
APPLICATION FILED MAY 25, 1906.
1,143,116.
Patented June 15, 1915.
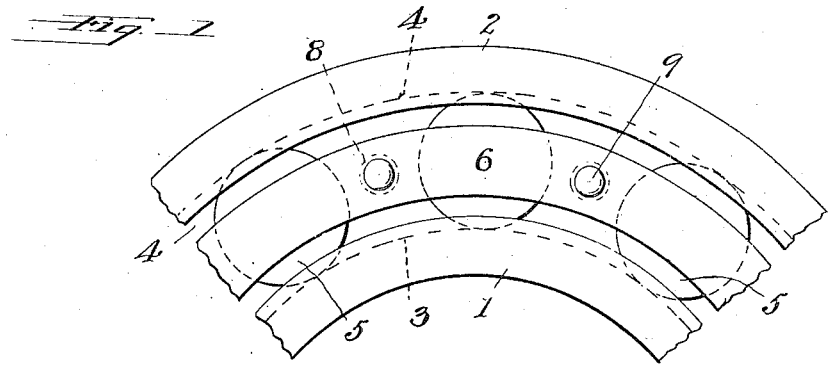
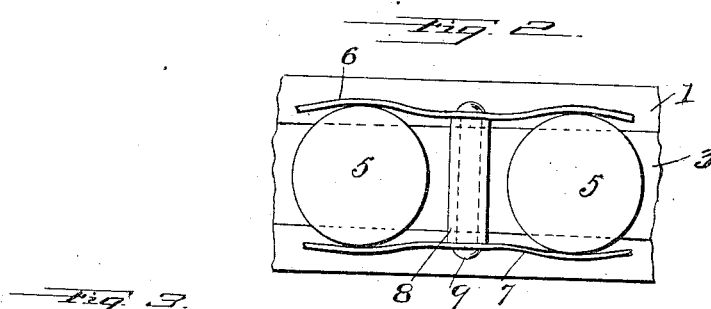
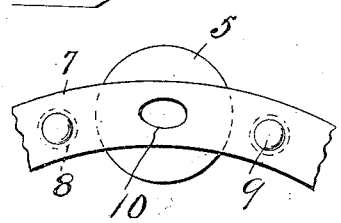
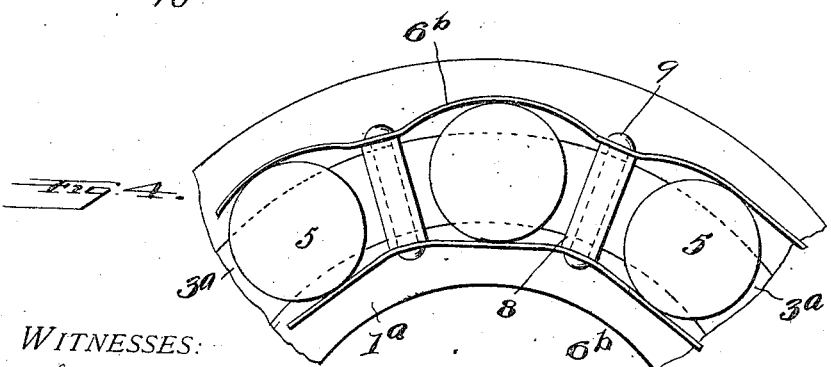
WITNESSES:
Chas. K. Davies.
Lilian Brock
INVENTOR
Henry Hess
BY
Brock+Smith
Attorneys

UNITED STATES PATENT OFFICE.

HENRY HESS, OF PHILADELPHIA, PENNSYLVANIA, ASSIGNOR TO THE HESS-BRIGHT MANUFACTURING COMPANY, OF PHILADELPHIA, PENNSYLVANIA, A CORPORATION OF DELAWARE.

ANTIFRICTION-BEARING.

1,143,116.

Specification of Letters Patent.

Patented June 15, 1915.

Application filed May 25, 1906. Serial No. 318,777.

*To all whom it may concern:*

Be it known that I, HENRY HESS, a citizen of the United States, and resident of Philadelphia, in the State of Pennsylvania, have invented certain new and useful Improvements in Antifriction-Bearings, of which the following is a specification.

This invention relates to anti-friction bearings employing anti-friction rollers and especially to cages or separators for spacing apart the rolling members of such bearings.

The characteristics and advantages of my invention are hereafter fully set forth in connection with a detailed description of the accompanying drawing which illustrates exemplifying structures embodying my invention.

In the exemplification chosen the anti-friction rollers are represented by balls.

In the drawing:—Figure 1 is an end view of a bearing embodying my invention; Fig. 2, a plan view of a bearing similar to Fig. 1 with the outer bearing ring removed; Fig. 3, a detail of modified form of separator; Fig. 4 is a plan view of a modified form of thrust bearing with one of the bearing rings removed.

Referring first to Figs. 1 and 2: 1 is an inner bearing ring; 2, an outer ring; 3, 4, race surfaces of suitable shape therein; 5, a series of balls running between the races; 6, the general designation of a cage or separator; 7, side rings of said cage, formed preferably of thin, flexible or spring metal, and also preferably carefully ground upon their inner surfaces; one of these rings is placed at each side of the series of anti-friction members; 8, spreaders conveniently in the form of tubes interposed between each two adjacent anti-friction members and desirably of a length somewhat less than the anti-friction members in the direction of the axis of the bearing. 9, members, such as rivets, conveniently passing through the spreaders 8 and side rings 7, and headed up so as to draw the rings closely against the spreaders. By means of this construction the side rings 7 are drawn toward each other between the anti-friction members and are caused to bear upon these members with a greater or less pressure depending upon the length of the spreaders 8 in relation to the size of the anti-friction members. If one of the anti-friction members tends to leave a position midway between two of the spreaders 8, such movement is resisted by its encountering a more restricted space between the side rings 7. The spring of the rings also tends always to return the anti-friction members to their proper central position. At the same time the construction described permits the anti-friction members to vary from their central positions when, for instance, as sometimes happens under running conditions, they tend to do so. This cage provides a simple and efficient means for permitting variations in the relative positions of the anti-friction members which, for reasons well understood in the art, is desirable in bearings of this class.

The side rings 7 may in some cases, as shown in Fig. 3, be provided at the desired normal position of the anti-friction members with apertures 10 which may be of any suitable shape. If round these apertures in engaging the anti-friction members tend to retain them in a fixed relative position and in this case serve simply as separators. If elongated, as shown in the drawing, the effect is to normally hold the anti-friction members in their proper central position, but to permit variations in the positions, as above described; and to tend to restore the members to correct positions when they have departed therefrom. I have employed these cages or separators in connection with thrust bearings, as shown in Fig. 4, as well as in radial bearings. This figure shows a thrust bearing having two rings of which one is removed displaying the balls 5 in position in their tread or race $3^a$ on the other bearing ring $1^a$.

Spring rings $6^b$ are placed one inside and the other outside the ball series and the rings are drawn together between adjacent balls and secured by the spreaders 8 and rivets 9.

I do not intend to limit myself to any of the details shown and described, but contemplate any variations which may be made within the spirit of my invention.

I claim:

The combination of bearing rings provided with races, a series of balls running in the races between the rings, separator rings of flexible material, one on each side of the ball series, the rings being provided with elongated recesses at the points where they touch the balls, and means intermediate the balls serving to hold the separator rings closer together at these points than at the points where they engage the balls.

In testimony whereof I have affixed my signature in the presence of two witnesses.

HENRY HESS.

Witnesses:
 THEO. H. M'CALLA,
 CLEMENT L. M'CALLA.